United States Patent
Achs et al.

(10) Patent No.: US 6,550,232 B1
(45) Date of Patent: Apr. 22, 2003

(54) ENERGY GUIDE CHAIN FOR GUIDING LINES COMPRISING CHAIN LINKS WHICH CAN MOVE IN THREE DIMENSIONS

(75) Inventors: Stephan Raymond Achs, Bayside, WI (US); Herbert Wehler, Neunkirchen (DE); Willibald Weber, Netphen (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 09/786,027

(22) PCT Filed: Aug. 30, 1999

(86) PCT No.: PCT/EP99/06373

§ 371 (c)(1), (2), (4) Date: May 15, 2001

(87) PCT Pub. No.: WO00/12913

PCT Pub. Date: Mar. 9, 2000

(30) Foreign Application Priority Data

Aug. 31, 1998 (DE) .......................................... 198 39 575

(51) Int. Cl.[7] .............................................. F16G 13/00
(52) U.S. Cl. ................................. 59/78.1; 59/78; 248/49
(58) Field of Search ...................... 59/78.1, 78; 248/49; 137/355.16

(56) References Cited

U.S. PATENT DOCUMENTS

| | | | |
|---|---|---|---|
| 1,945,357 A | | 1/1934 | Pierce |
| 3,473,769 A | | 10/1969 | James |
| 3,804,232 A | | 4/1974 | Freiwald et al. |
| 4,590,961 A | * | 5/1986 | Schumann ................... 59/78.1 |
| 4,953,735 A | | 9/1990 | Tisbo et al. |
| 5,157,913 A | * | 10/1992 | Wehler et al. ............... 59/78.1 |
| 5,307,923 A | | 5/1994 | Damkjaer |
| 6,065,278 A | * | 5/2000 | Weber et al. ................. 59/78.1 |
| 6,107,565 A | * | 8/2000 | O'Rourke ..................... 59/78.1 |
| 6,167,689 B1 | * | 1/2001 | Heidrich et al. ............. 59/78.1 |
| 6,174,020 B1 | | 1/2001 | Knettle et al. |
| 6,318,063 B1 | * | 11/2001 | Komiya et al. ............... 59/78.1 |

FOREIGN PATENT DOCUMENTS

| | | |
|---|---|---|
| DE | 39 30 291 C1 | 4/1991 |
| DE | G93 13 011 U1 | 2/1995 |
| DE | 297 00 917 U1 | 2/1997 |
| EP | 0 154 882 A1 | 9/1985 |
| EP | 0 277 512 A1 | 8/1988 |
| EP | 0 384 153 A2 | 8/1990 |
| EP | 0 544 051 A1 | 6/1993 |
| GB | 1 585 656 | 3/1981 |

* cited by examiner

*Primary Examiner*—David Jones
(74) *Attorney, Agent, or Firm*—Alston & Bird LLP

(57) ABSTRACT

An energy line guide chain for running lines between a stationary and a movable connection, with jointed chain links of plastic, which define each a channel section extending in the direction of the energy line guide chain. Each chain link comprises opposite link plates extending in spaced relationship in a longitudinal direction of the energy line guide chain. The link plates are interconnected by at least one crosspiece. Each link plate comprises a joint body (6) and a joint receiver (7), which extend substantially crosswise to the longitudinal direction of the energy line guide chain. The joint body (6) of a link plate engages the joint receiver (7) of an adjacent link plate. Between the partially overlapping link plates of two adjacent chain links, a clearance is provided. The joint body (6) comprises two diametrically opposite outer surface areas (19). The joint receiver (7) has two diametrically opposite inner surface areas (18). The outer surface areas and inner surface areas define diametrically opposed gaps (17) which permit a lateral deflection of the chain links.

25 Claims, 14 Drawing Sheets

ENERGY GUIDE CHAIN FOR GUIDING LINES COMPRISING CHAIN LINKS WHICH CAN MOVE IN THREE DIMENSIONS

BACKGROUND OF THE INVENTION

The invention relates to a guide chain for running energy lines between a stationary connection and a movable connection with movable chain links, which define each a channel section extending in the direction of the energy line guide chain.

GB 1 585 656 A1 discloses a guide chain for running lines between a stationary connection and a movable connection. The energy line guide chain is formed by pivotally connected, metallic chain links. The chain links comprise spaced-apart side walls, which are stamped from a sheet of metal and bent into shape accordingly. The spaced-apart side walls of each chain link are interconnected by a connecting plate. The connection occurs by welding, so that the chain links form a welded structure.

For a pivotal connection of adjacent chain links, the side walls comprise a circular aperture in their one end region. In the opposite end region of each side wall, an elongate slot is formed. The apertures of the one chain link are positioned with the elongate slots of the adjacent chain link such that a rivet can be passed through the elongate slot and the aperture. The rivet has a widened head with a cross section greater than the cross section of the aperture and elongate slot, respectively. To secure the rivet, a circlip is provided, which is arranged on the rivet.

The provision of the elongate slot is necessitated by the welded structure of the chain links, since elongate slots are capable of compensating manufacturing-related inaccuracies of the welded structure.

The chain links of the energy line guide chain as disclosed in GB 1 585 656 A1 are adapted for pivoting about the rivets, which extend substantially crosswise to the longitudinal direction of the energy line guide chain.

A further embodiment of a conventional energy line guide chain, wherein the chain links are adapted for deflecting about axes extending crosswise to the longitudinal direction of the energy line guide chain, is disclosed in EP 0 154 882 A1. The chain links of this energy line guide chain consist of a plastic. They are formed by link plates, which are made in one piece. At one end, each link plate possesses a central joint bore. At the other end of each link plate, a central joint pin is molded to the opposite side. When the one end of a chain link is connected to the other end of an adjacent chain link, the joint pin will engage the joint bore. This permits forming a chain strand. Two chain strands are interconnected by crosspieces.

EP 0 544 051 A1 discloses an energy line guide chain, which enables an isotropic bending capability in the space, i.e. a capability of bending uniformly in the space.

Such an energy line guide chain is necessary, for example, for a multiaxial handling device, such as, for example, a robot.

This energy line guide chain is formed by an extruded tubing, whose outer circumferential wall is provided with a plurality of circumferential slots arranged in spaced relationship in the longitudinal direction of the energy line guide chain and extending crosswise to the longitudinal direction of the energy line guide chain. These circumferential slots, which extend over the entire circumference of the tubing, are each interrupted by only one flexibly connecting crosspiece or only two flexibly acting crosspieces diametrically opposite to each other at an angular distance of 180°0. The crosspieces of adjacent circumferential slots are offset relative one another by an angle at circumference of 90°0. The width of the circumferential slots and their spacing between one another are dimensioned in accordance with a desired maximum bending radius of the energy line guide chain.

An energy line guide chain of this kind is problematic in that it is necessary to exchange the entire energy line guide chain, when a segment thereof is damaged, since the energy line guide chain consists of an extruded sectional tubing of plastic. This entails an increased expenditure for repair, since it is also necessary to remove from the energy line guide chain being replaced, lines and hoses extending therein, and to insert them into the new energy line guide chain.

The attachment of the energy line guide chain to a stationary connection or a movable connection occurs by chain links, which are joined to a corresponding connector. EP 0 384 153 discloses the design and construction of different end links of the chain. The chain end links comprise side plates, which are interconnected by a bottom plate. The chain end links are jointed to the adjacent chain link of the energy line guide chain. The bottom plate is screwed to a support or base plate such that the chain end link is rigidly connected to the support or base plate. A further development of a chain end link with a strain relief arrangement for an energy line guide chain is also known from Utility Model G 93 13 011. Likewise in the case of this chain end link, a bottom plate is provided, which is connected to a support or base plate.

Based on the foregoing, it is an object of the present invention to design and construct the known guide chain for running energy lines with spatially movable chain links, so that the energy line guide chain is repairable at relatively little cost. It is a further object of the invention to design and construct the energy line guide chain such that it is capable of receiving greater line weights. A yet further object of the invention is to describe a connecting link, which is easy to apply to a connection point, in particular a connecting link, which assists the deflection capability of the energy line guide chain.

SUMMARY OF THE INVENTION

The above and other objects and advantages of the invention are achieved by the provision of a guide chain for running energy lines which distinguishes itself in that it is constructed by individual, spatially limited, i.e., three-dimensionally movable chain links. In an extruded energy line guide chain as known from EP 0 554 051, an articulation is possible only, when the extruded sectional tubing exhibits a certain elasticity. As a result, such an energy line guide chain is capable of receiving only relatively low line weights. In the case of an energy line guide chain, as proposed by the present invention, each chain link comprises two opposite link plates extending in spaced relationship in a longitudinal direction of the energy line guide chain. The link plates are interconnected by at least one crosspiece. Each link plate comprises a joint body and a joint receiver, which extend substantially crosswise to the longitudinal direction of the energy line guide chain. The joint body of a link plate engages the joint receiver of an adjacent link plate. The articulated connection as is formed by the joint body and the joint receiver, does not form an integral part of the chain links, as is the case with an extruded sectional tubing of the energy line guide chain. As a result, the joint bodies and joint receivers may be designed and constructed for a greater load capacity. This applies likewise to the link plates and the crosspiece. As a result of releasably joining the chain links by the articulated connections, it will also be possible to repair the energy line guide chain, when one or more chain links have become defective.

In the case of the energy line guide chain as proposed by the invention, a clearance is provided respectively between the partially overlapping link plates of at least two adjacent chain links. Also each joint body comprises an outer surface area and each joint bore comprises an inner surface area. The outer surface area and the inner surface area define diametrically opposite contact areas where the outer and inner areas are in contact, and diametrically opposite gaps where there is a clearance between the areas. The contact areas thus form a pivot axis extending therebetween and which is perpendicular to the longitudinal direction of the energy line guide chain. The pivoting capability of the individual chain links relative to one another is thus achieved only by having the outer and inner surface areas lie against one another. The clearance which is provided between the partially overlapping plates of adjacent chain links allows the energy line guide chain to deflect substantially crosswise to its longitudinal axis.

According to an advantageous development of the energy line guide chain, it is proposed to make the joint body cylindrical. Preferably, the joint receiver has a substantially oval cross section. An oval cross section also means the shape of a race track. The spacing of the substantially parallel extending segments of the race track shape corresponds substantially to the diameter of the joint body, so that the joint body is rotatable about its longitudinal axis. As a result of providing the joint receiver with a substantially oval cross section, there is a play between the joint body and the joint receiver, which enables a deflection about an axis extending substantially perpendicularly to the longitudinal axis of the joint body and to the longitudinal direction of the energy line guide chain.

Instead of making the joint body cylindrical, the joint receiver as such may also have a circular cross section. In this instance, the joint body has a substantially oval cross section. The cross sectional area of the circular joint receiver is greater than the cross sectional area of the joint body. Likewise, this development of the joint connection of two adjacent chain links allows these chain links to deflect in three dimensions.

The link plates and the crosspiece are made of plastic, preferably in one piece. In this instance, the chain link has a substantially U-shaped cross section. The link plates may be designed and constructed with a closing strap or cover, so as to enable access to the channel of the energy line guide chain. This makes it also possible to lay lines in the channel at a later time, or to remove individual lines from the channel. Likewise, it is possible to examine individual lines in the energy line guide chain, without having to pull these out of the energy line guide chain, as is the case with an energy line guide chain disclosed in EP 0 544 051 A1.

A further, advantageous development of the energy line guide chain according to the invention proposes to adapt two adjacent chain links for a pivotal movement relative to each other at an angle of 45°.

A yet further advantageous development of the energy line guide chain according to the invention proposes to make the joint body from joint body segments separated from another by slots. In particular, the joint body comprises a radially outward directed collar in the region of its free end segment. In such a configuration of the joint body, the latter or its segments are compressed as the joint body passes through the joint receiver, so that upon completion of the passage, the joint body or the joint body segments return to their initial position, and that the collar extends around the edge of the joint receiver. The collar has a certain safety function, since it enables an improved hold of the chain links. To ensure that the collar does not assume an entraining function during an operation of the energy line guide chain, it is proposed to provide a cavity in concentric relationship with a joint receiver, into which the collar extends with a play. Preferably, the cavity is dimensioned such that the collar does not project laterally from the link plate. Should the lateral surface of the link plate slide along an object, the collar would not abrade, since it is arranged inside the link plate. This arrangement also reduces a possible risk of injury by a collar projecting from the link plate.

A further advantageous development of the energy line guide chain according to the invention proposes that the crosspiece comprises a convexly curved portion, which lies in a plane extending substantially crosswise to the link plate. The crosspiece further comprises an opposite portion made to correspond with the convexly curved portion. The chain links of the energy line guide chain are arranged such that the convex portion of the crosspiece of one chain link engages the corresponding opposite portion of the crosspiece of an adjacent chain link.

This configuration of the crosspiece allows to accomplish that adjacent chain links are guided while being pivoted. A guidance of the chain links is accomplished, preferably by forming the convexly curved portion in a free end region of a projection extending in the longitudinal direction of the energy line guide chain. The crosspiece comprises a cutout that merges into the region, with the cutout narrowing from an end face of the crosspiece in the direction of the concave portion. As a result of narrowing the concave portion, it is possible to limit the deflection capability of adjacent chain links. The advantageous further development of the energy line guide chain allows to accomplish likewise that the crosspieces form quasi a cover, which protects the lines laid in the energy line guide chain against external influences. In particular, it is prevented that dirt particles enter the energy line guide chain.

The chain links of the energy line guide-chain are made preferably of a plastic. In particular, it is suggested that the plastic be fiber-glass reinforced. To simplify the manufacture of the individual chain links, a further advantageous development of the energy line guide chain proposes to make at least the convex portion and the concave portion symmetrical with respect to an axis extending substantially parallel to the longitudinal axis of the energy line guide chain.

To receive greater line weights or for greater self-supporting lengths of the energy line guide chain, it is proposed that two adjacent chain links comprise two spaced-apart outer joint axes. In this instance, adjacent links comprise crosspieces, whose overall extension between the joint axes is greater than the spacing of the joint axes. This allows to prestress the energy line guide chain, thereby enabling it to receive greater line weights. The energy line guide chain with a prestress may also have a greater self-supporting length than is the case with an energy line guide chain without a prestress.

For purposes of limiting the angle of traverse of adjacent chain links and, thus, likewise for forming a predetermined radius of curvature, it is proposed that at least two adjacent chain links comprise two spaced-apart, opposite crosspieces, which extend crosswise to the longitudinal direction of the energy line guide chain. In a stretched state of the energy line guide chain, the crosspieces of adjacent chain links, which extend in a common plane, are spaced from each other. In a curved region of the energy line guide chain, these crosspieces adjoin each other.

A yet further, advantageous development of the invention proposes that the energy line guide chain comprises at least one crosspiece, which can be detachably connected with its one end to a link plate. The other end of the crosspiece is advantageously connected to the link plate by means of a film hinge. The link plate, the film hinge, and the crosspiece may be made in one piece.

In particular, it is proposed that in the region of the film hinge, the crosspiece comprises at least one projection, so that in a closed position of the crosspiece, the projection lies on an edge of the link plate. This allows to accomplish that the film hinge is relieved, when the crosspiece has taken its closed position, and a force is exerted on the crosspiece in the direction of a channel section. In this instance, the force is absorbed by the projection, so that the film hinge is held substantially free of stress. A yet further, advantageous development proposes that the crosspiece forms a cover.

To limit the angle of traverse of adjacent link plates about an axis extending substantially crosswise to the longitudinal direction of the energy line guide chain, it is proposed that the link plate comprises at its one end a stop element and at its other end a stop surface, which is made substantially parallel to a center plane of the link plate. This configuration of the link plate accomplishes that during a lateral swing motion of adjacent link plates, the stop and stop surface prevent the chain links or link plates from locking up.

A further inventive concept proposes a guide chain for running energy lines between a stationary and a movable connection, with jointed chain links of plastic. This guide chain comprises at least one connecting link. The connecting link is designed and constructed such that it facilitates joining the connection link to a connection point or to a connection element, which is attached to the connection point. In particular, the connecting link is designed and constructed such that it assists the deflection capability of the energy line guide chain.

The energy line guide chain of the present invention with at least one connecting link distinguishes itself in that the at least one connecting link comprises a base body with at least one receptacle for receiving a connection element mounted to a connection point, and a locking element cooperating with the base body, which is adapted for locking the connection element with a base body.

More concretely, it is proposed to limit the receptacle by a wall, which is molded to the bottom, and made at least in part spring-elastic, and that the wall forms with the connection element a snap connection. This configuration of the connecting link in combination with the connection element, which is mounted to a connection point, facilitates joining the connecting link to the connection element.

A further advantageous development of the energy line guide chain proposes to form the wall by at least two wall segments, which are separated by slots. Preferably, four wall segments form the wall, with two opposite wall segments being made substantially rigid, and the two further opposite wall segments being made substantially spring-elastic. Preferably, the substantially spring-elastic wall segments comprise corresponding recesses or projections, which form a snap connection with a correspondingly constructed connection element. The spacing of the further wall segments may be greater than the inside width of the connection element, so that only the spring-elastic wall segments produce a connection between the connecting link and the connection element.

A yet further, advantageous development of the energy line guide chain proposes to join the locking element to the base body for displacement therewith, so that the locking element impedes at least the deflection capability of the wall in a locking position, and releases it in another position. This advantageous configuration and further development of the energy line guide chain accomplish that the mounting of the connecting link to a connection element can be realized in a very simple manner and with very little force, since only the spring-elastic wall segments must be pushed apart. A locking engagement is realized by the locking element.

To realize an easy and reliable locking engagement, an advantageous development of the energy guide chain proposes to make the locking element substantially U-shaped. In this instance, the free legs of the locking element lie in the locking position at least in part against the wall, in particular against the elastic wall segments, so that the wall segments are prevented from springing apart.

It is proposed that the base body of the connecting link comprises a slide-in opening, in which the locking element is held for displacement. In the locking position, the free legs lie in part against the wall, in particular against the elastic wall segments and the lateral surfaces of the slide-in opening. This ensures that even in the case of relatively high pull-off forces, the locking engagement remains secured, since the side walls of the slide-in opening restrict the free legs of the locking element in their freedom of movement.

To ensure that a locking engagement of the connecting link with the connection element is enabled only, when the connection between the connecting link and the connection element is properly established, a yet further, advantageous development of the energy line guide chain proposes that the locking element comprises a safety flap, which is spaced from the legs and made substantially parallel to same. In this instance, the locking element can be moved to its locking position only, when the connection element releases the safety flap.

To this end, it is proposed in an advantageous manner to provide the base body with a projection, which extends into the plane of movement of the safety flap. The safety flap comprises an opening, which the projection engages in the locking position. The safety flap can then be deflected by the connection element such that same can be brought to the locking position.

To prevent an automatic release of the locking engagement, it is proposed that the projection and the opening are adapted to each other in their shape, so that a movement of the safety flap is prevented.

A yet further, advantageous development of the energy line guide chain proposes that the receptacle extends fully through the base body. In particular, it is proposed to make the receptacle and connection element rotationally symmetric, thereby allowing the connecting link to perform a swing motion.

BRIEF DESCRIPTION OF THE DRAWINGS

In the following, further details and advantages of the energy line guide chain according to the invention are described in greater detail with reference to embodiments shown in the drawing, in which.

DETAILED DESCRIPTION OF THE PREFERRED EMBODIMENTS

Figure 2:
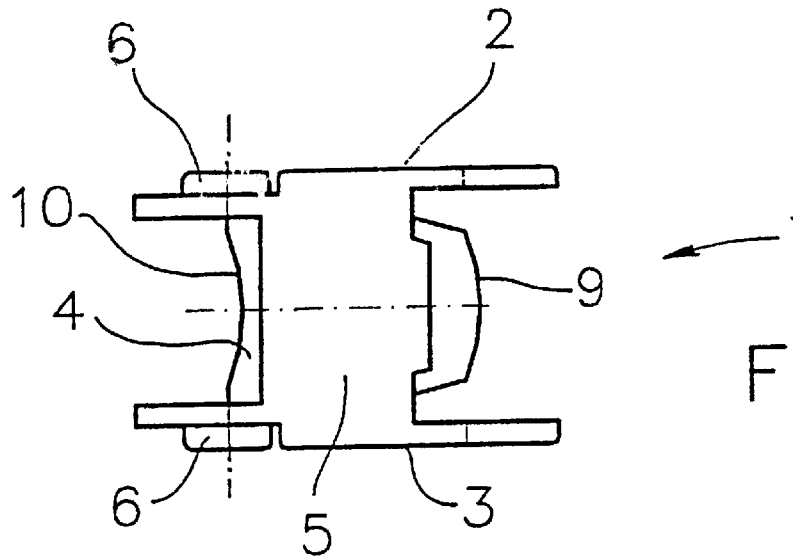
FIG. 2 is a bottom view of a chain link of FIG. 1.
Figure 1:
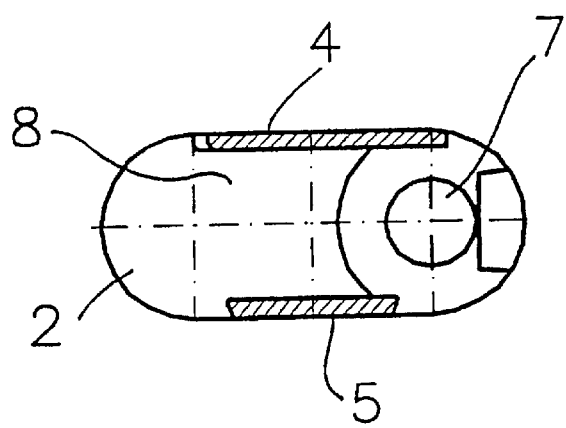
FIG. 1 is a fully sectioned front view of a first embodiment of a chain link.
Figure 3:
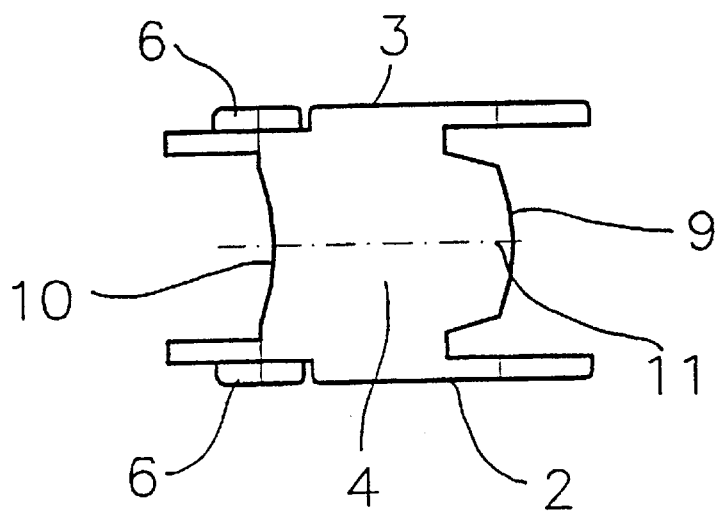
FIG. 3 is a top view of the chain link of FIG. 1.

FIGS. 1–3 illustrate a first embodiment of a chain link 1 for a guide chain for running energy lines. The chain link 1 comprises two link plates 2, 3 facing each other in spaced relationship and extending in a longitudinal direction of the energy line guide chain.

Each link plate 2, 3 comprises a joint body 6 and a joint receiver 7. The joint body 6 is formed on an outer side of link plates 2 and 3, respectively. The joint body 6 and the joint receiver 7 extend substantially crosswise to the longitudinal direction of the energy line guide chain. The joint body 6 and the joint receiver 7 are designed and constructed in spaced relationship with each other, when viewed in the longitudinal direction of the chain link.

Crosspieces 4 and 5 interconnect the link plates 2, 3. The crosspieces 4, 5 are designed and constructed in spaced relationship with each other. Both the crosspieces 4, 5 and the link plates 2, 3 define a channel section 8 for arranging the lines. Each crosspiece 4, 5 is substantially aligned with a longitudinal edge of link plate 2 or 3.

The crosspiece 4 comprises a convexly curved portion 9, which extends in a plane extending substantially crosswise to each link plate 2 or 3. The crosspiece 4 includes a portion 10, which is designed and constructed to correspond with the convexly curved portion 9. The portion 10 is opposite to the portion 9. The portion 9 and the portion 10 are symmetric with respect to an axis 11 extending substantially parallel to the longitudinal axis of the energy line guide chain.

Figure 4:
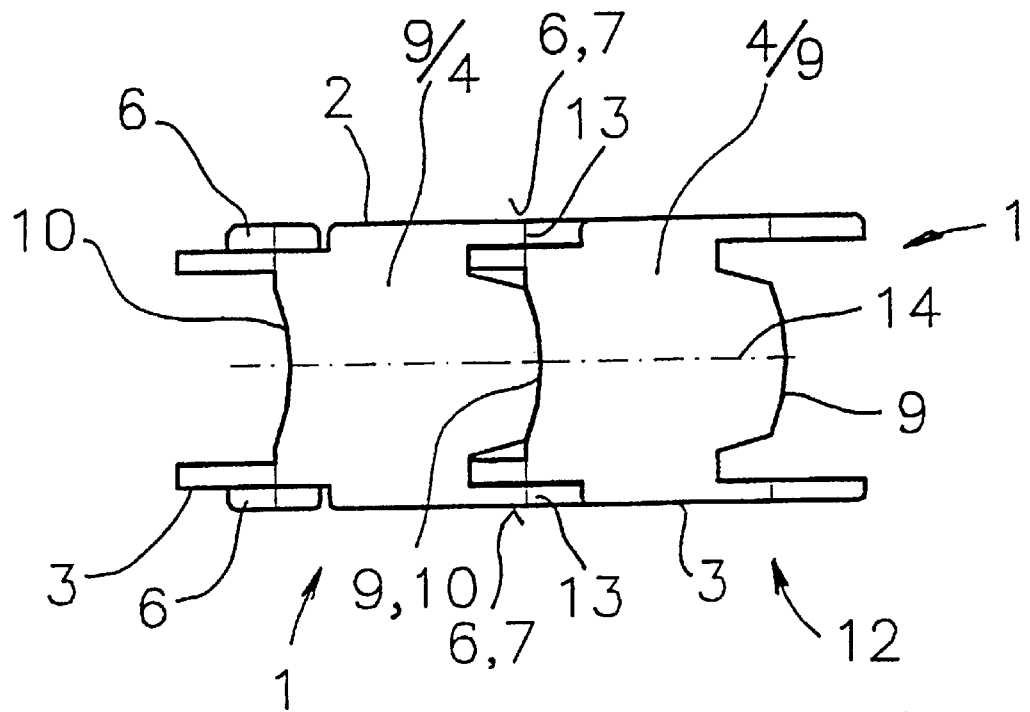
FIG. 4 is a top view of a segment of an energy line guide chain with chain links of FIG. 1.
Figure 5:
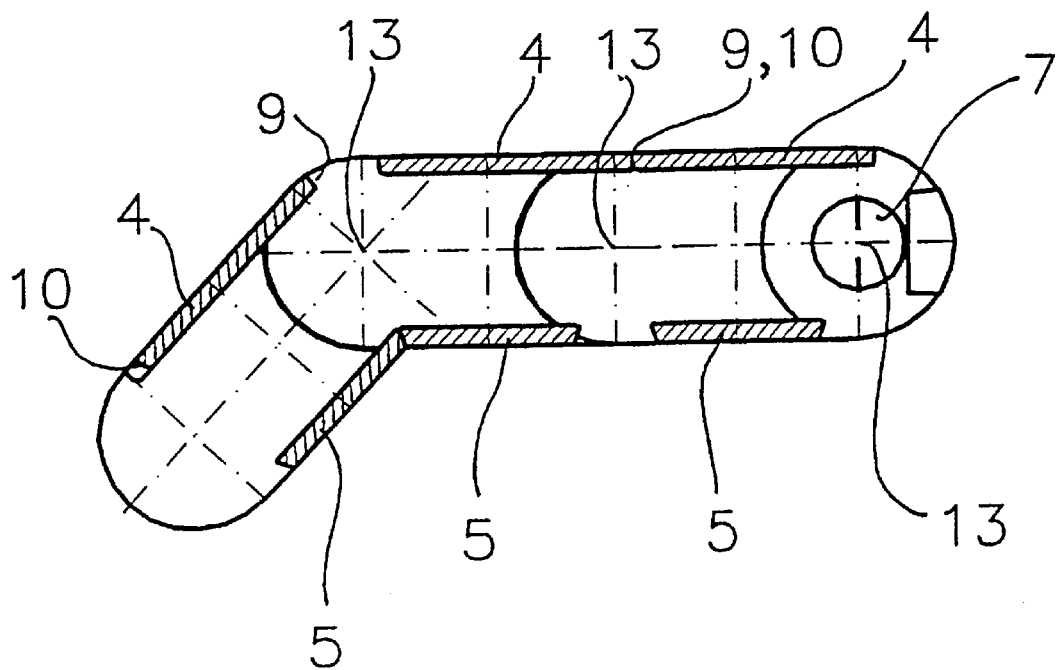
FIG. 5 is a fully sectioned front view of a segment of an energy line guide chain with chain links of FIG. 1.

FIGS. 4 and 5 show a first embodiment of an energy line guide chain 12 of the present invention. The energy line guide 12 is formed by chain links 1. The design and construction of each chain link 1 corresponds to that of the chain link shown in FIGS. 1–3.

The chain links 1 are interconnected by joints. The joint connection occurs by means of joint bodies 6, which engage joint receivers 7. Adjacent chain links 1 are adapted for pivoting about a joint axis 13 extending substantially perpendicularly to a longitudinal axis 14. As can be noted from FIG. 4, the portion 10 of crosspiece 4 lies against the convexly curved portion 9 of the crosspiece 4 of an adjacent chain link. The crosspieces 4 are designed and constructed such that, when viewed in the longitudinal direction of the energy line guide chain 12, same have an extension, which is greater than the spacing between two outer joint axes 13 of two chain links, thereby imparting to the energy line guide chain a prestress.

As shown in FIG. 5, the crosspieces 5 of adjacent chain links are adapted for coming into contact with their respective end faces, so that the crosspieces 5 define the radius of curvature of the energy line guide chain.

The joint connection of adjacent chain links occurs by means of joint bodies 6 and joint receivers 7. The joint connection of adjacent chain links is shown enlarged in FIGS. 6 and 7.

Figure 6:
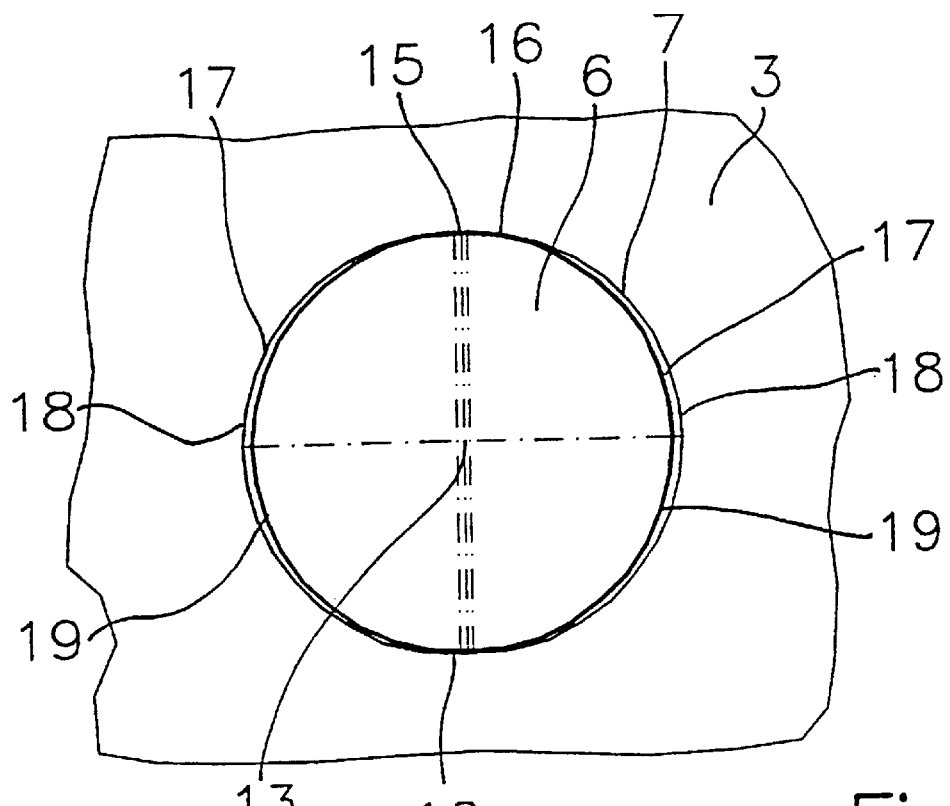
FIG. 6 is a front view, enlarged, of a joint connection between adjacent chain links.

In the embodiment of FIG. 6, each joint body 6 is substantially cylindrical, and the joint receiver 7 has a substantially oval cross section. The joint body 6 and joint receiver 7 comprise surface sections, which form diametrically opposite contact areas 16. The contact areas 16 each extend substantially in the longitudinal direction of the link plates 3. Between the diametrically opposite contact areas 16, a gap 17 is formed on each side of the joint body 6 which extends between an inner surface area 18 of joint receiver 7 and an outer surface area 19 of the joint body 6. The joint connection comprises two substantially diametrically opposite gaps 17, which are crescent-shaped in the illustrated embodiment. When viewed in the circumferential direction of joint body 6, the gaps each extend from a contact area 16 to the contact area 16 on the opposite side.

The gap 17 between joint body 6 and joint receiver 7 allows adjacent chain links to pivot. The chain links are adapted for pivoting about a pivot axis 15, which is substantially perpendicular to the joint axis 13.

Between the overlapping regions of link plates 2, 3 of adjacent chain links, a clearance 20 is formed, which allows adjacent chain links to pivot about pivot axis 15. While pivoting about pivot axis 15, the surfaces of both the convexly curved portion 9 and the correspondingly constructed portion 10 slide along each other.

Each chain link 1 of energy line guide chain 12 is capable of deflecting about a joint axis 13 and a pivot axis 15, so that adjacent chain links of an energy line guide chain can be deflected with a spatial limitation, i.e. in a three-dimensional space. The energy line guide chain 12 may be designed and constructed with such configured chain links 1 in full or in sections.

Figure 6A:
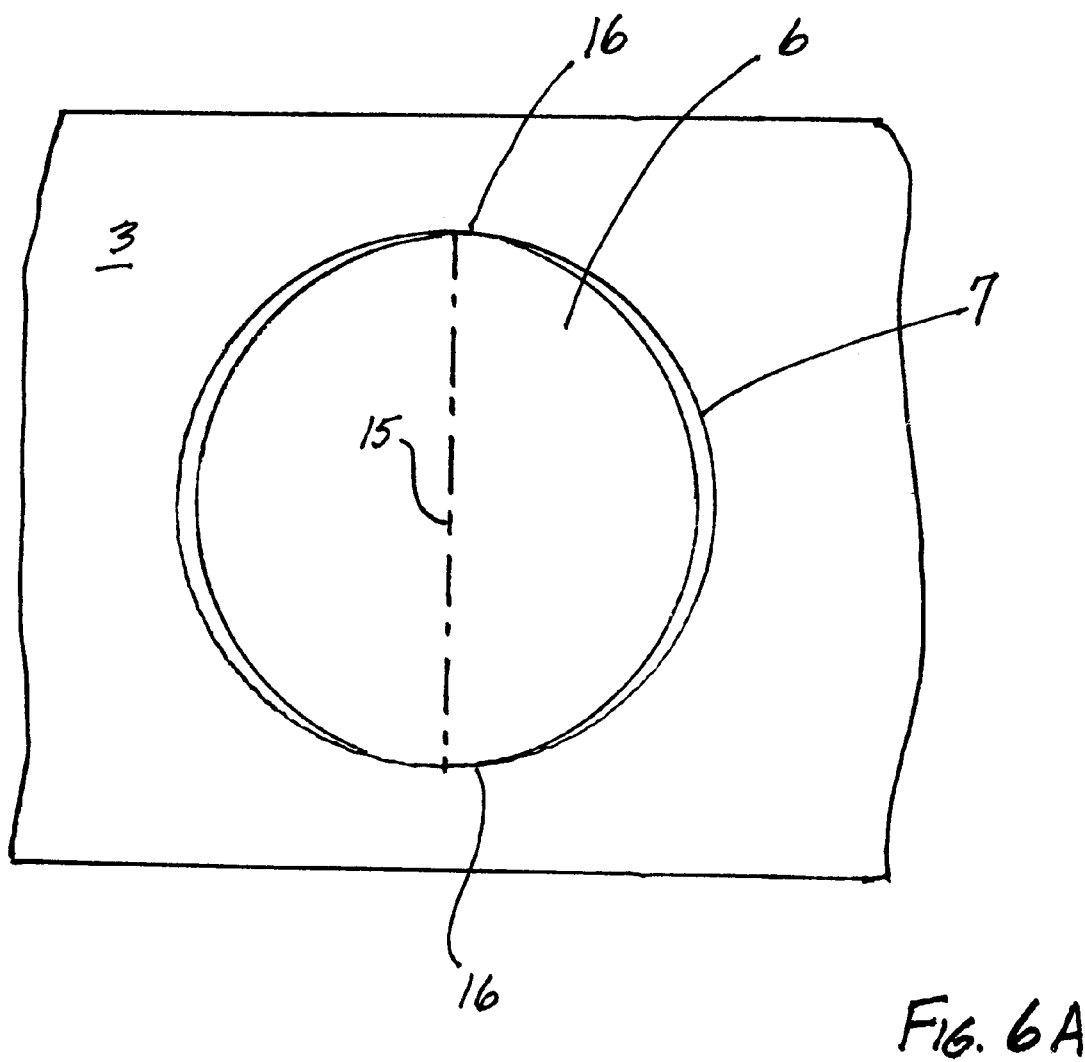
FIG. 6A is a view similar to FIG. 6 and illustrating a different embodiment of the joint body and receiver.

FIG. 6A illustrates an embodiment wherein the joint body 6 has an oval cross section and the joint receiver 7 has a circular cross section.

Figure 8:
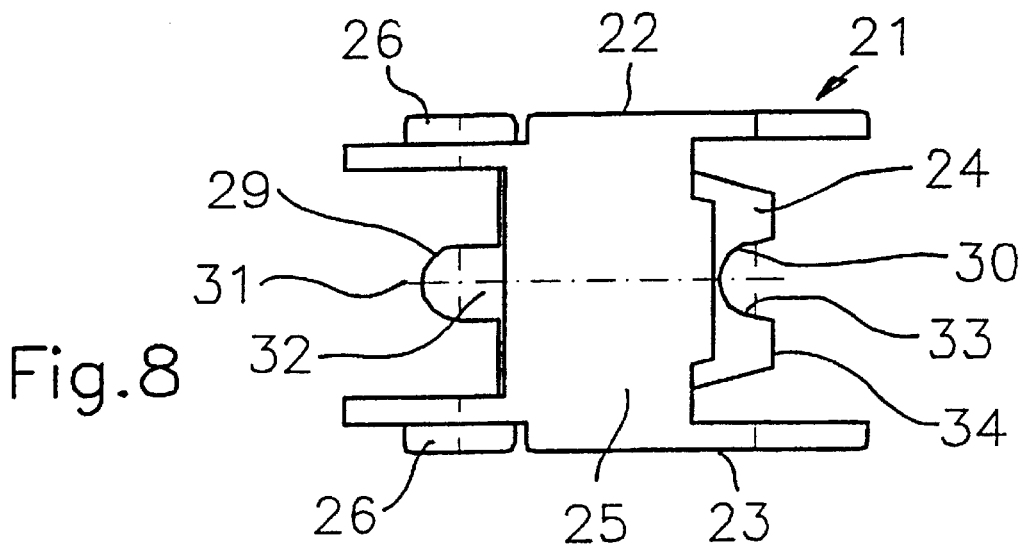
FIG. 8 is a bottom view of a further embodiment of a chain link.
Figure 9:
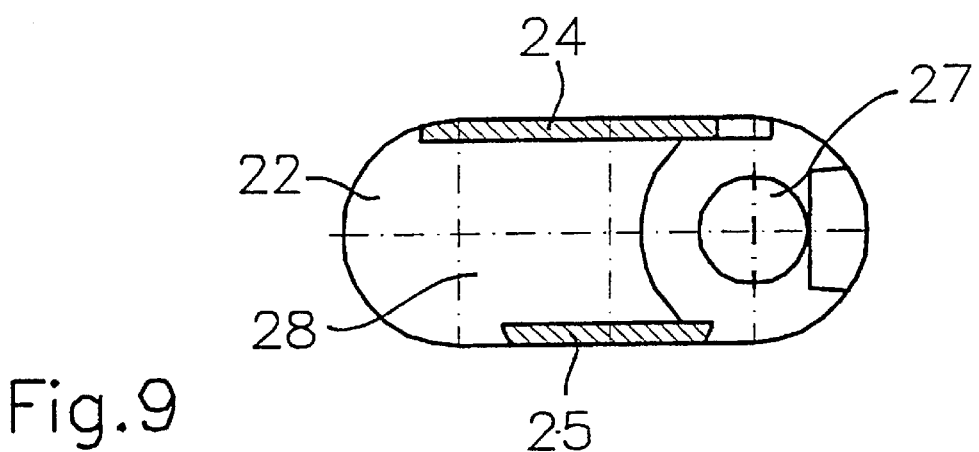
FIG. 9 is a fully sectioned front view of the chain link of FIG. 8.
Figure 10:
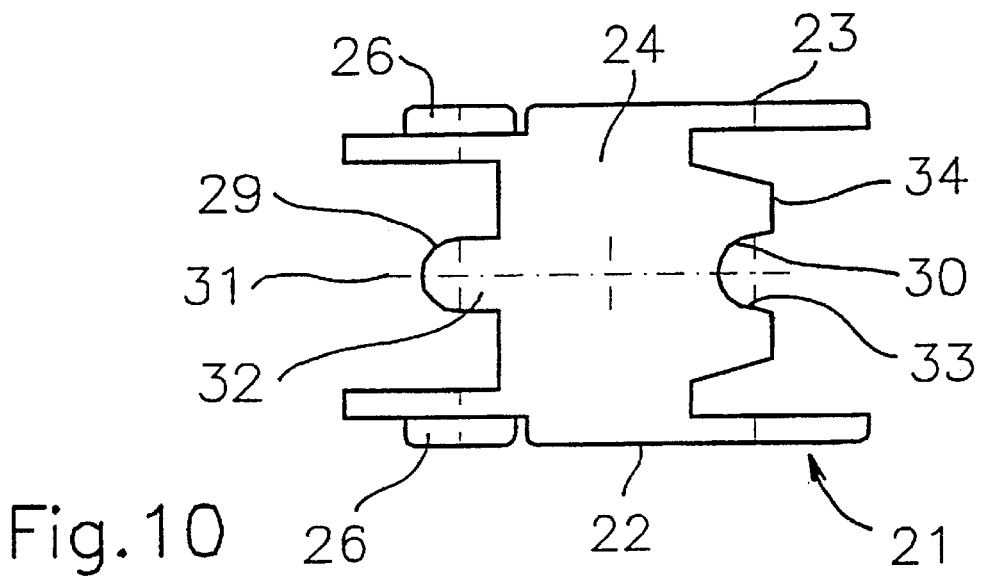
FIG. 10 is a top view of the chain link of FIG. 8.

FIGS. 8 and 9 show a second embodiment of a chain link 21. The chain link 21 comprises two spaced-apart, opposite link plates 22, 23, which extend in a longitudinal direction of an energy line guide chain. Each link plate 22, 23 comprises a joint body 26 and a joint receiver 27. The joint body 26 and joint receiver 27 extend substantially crosswise to the longitudinal direction of an energy line guide chain. The joint body 26 and joint receiver 27 of the link plates 22, 23 are designed and constructed such that they engage each other, when the chain links 21 are joined.

Each link plate 22, 23 is interconnected by two crosspieces 24, 25. The crosspieces 24, 25 are substantially aligned with a longitudinal edge of link plates 22 and 23, respectively. The link plates 22, 23 and crosspieces 24, 25 define a channel section 28.

The crosspiece 24 comprises an extension 32 extending in the longitudinal direction of the energy line guide chain. The extension 32 comprises a substantially convexly curved portion 29. The extension 32 and the convexly curved portion 29 are made substantially symmetric with respect to an axis 31. The axis 31 extends substantially parallel to the longitudinal axis of the energy line guide chain.

The crosspiece 24 comprises a concavely curved portion 30, which is formed opposite to the convexly curved portion 29. The portion 30 is made to correspond with portion 29. It is formed in a cutout 33. The cutout 33 extends from an end face 34 inward into the crosspiece 24 and in the direction of axis 31. The cutout 33 narrows from end face 34 in the direction of concave portion 30.

Figure 11:
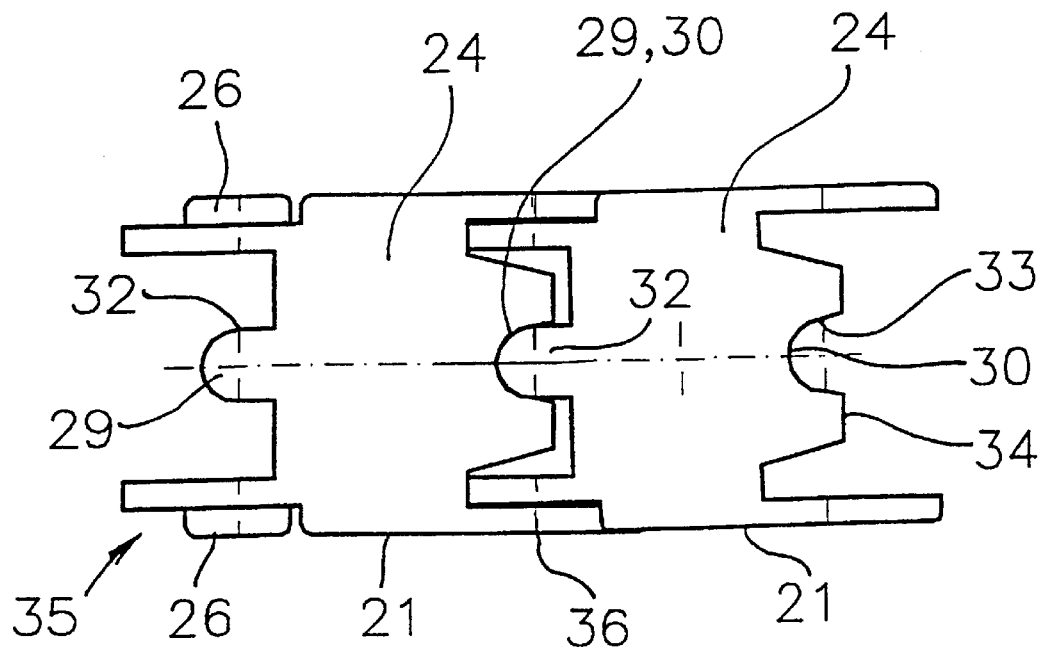
FIG. 11 is a top view of a segment of an energy line guide chain with chain links of FIG. 8.
Figure 12:
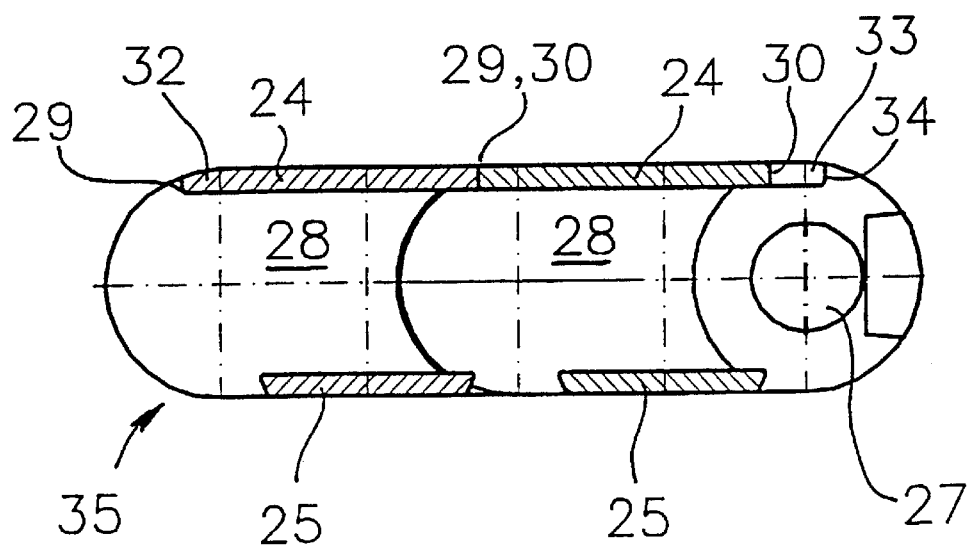
FIG. 12 is a fully sectioned front view of the energy line guide chain of FIG. 11.
Figure 13:
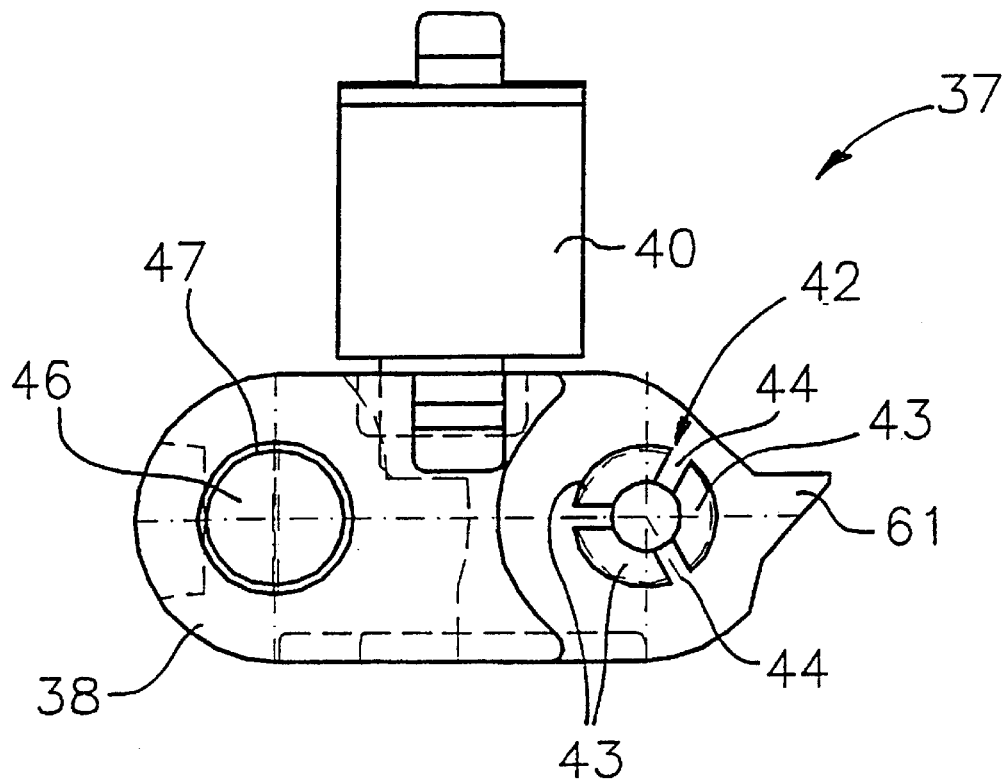
FIG. 13 is a front view of a further embodiment of a chain link.

FIGS. 11 and 12 show a segment of an energy line guide chain 35, which is assembled from chain links 21. Adjacent chain links 21 are each capable of deflecting about a joint axis 36. The joint axis 36 is formed by pairing joint body 26 and joint receiver 27. As best seen in FIG. 11, the extension 32 engages with its convexly curved portion 29 the cutout 33 with its concavely curved portion 30. Both the crosspieces 24 and the extensions 32 and cutouts 33 are designed and constructed such that the energy line guide chain 35 is prestressed, which is not absolutely mandatory.

The radius of curvature is limited by the stops formed by crosspieces 25.

Figure 7:
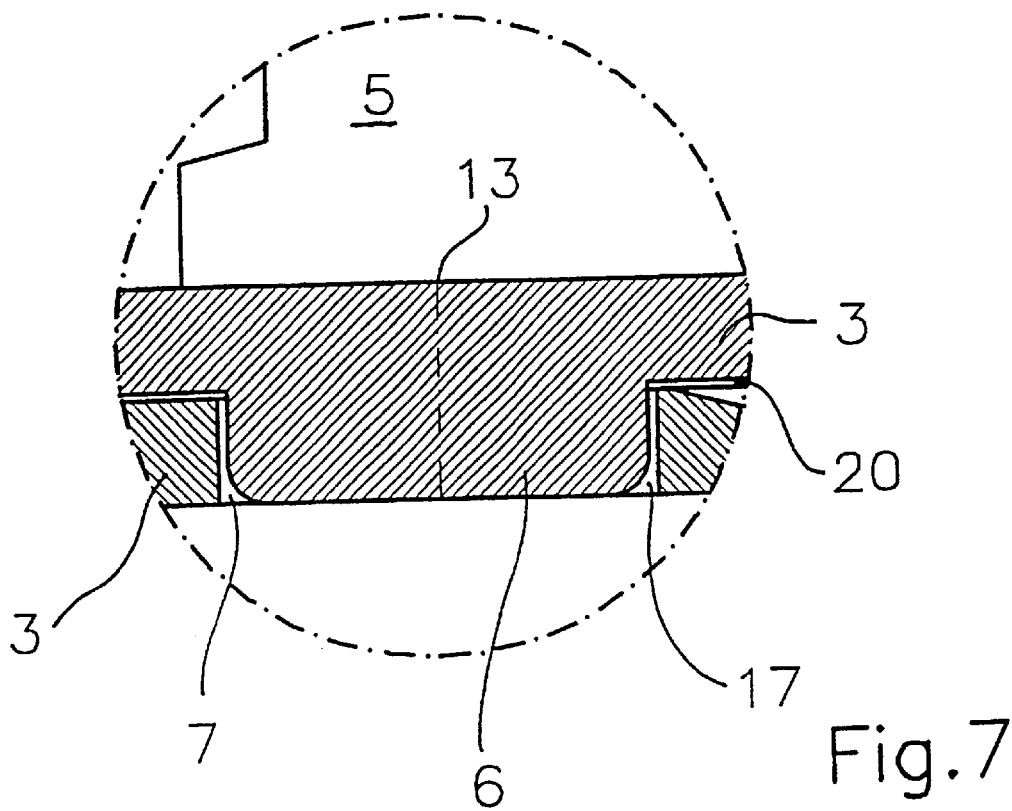
FIG. 7 is a sectional top view of a joint connection of FIG. 6.

Both the joint body 26 and the joint receiver 27 of the chain links are designed and constructed in the same way as those of chain link 1. For this reason, the description with reference to FIGS. 6 and 7 is herewith incorporated by reference.

FIGS. 13 to 17 illustrate a further embodiment of a chain link 37 of plastic for a guide chain for running energy lines. The chain link 37 is made in one piece of a plastic, in particular by the injection molding method.

Figure 17:
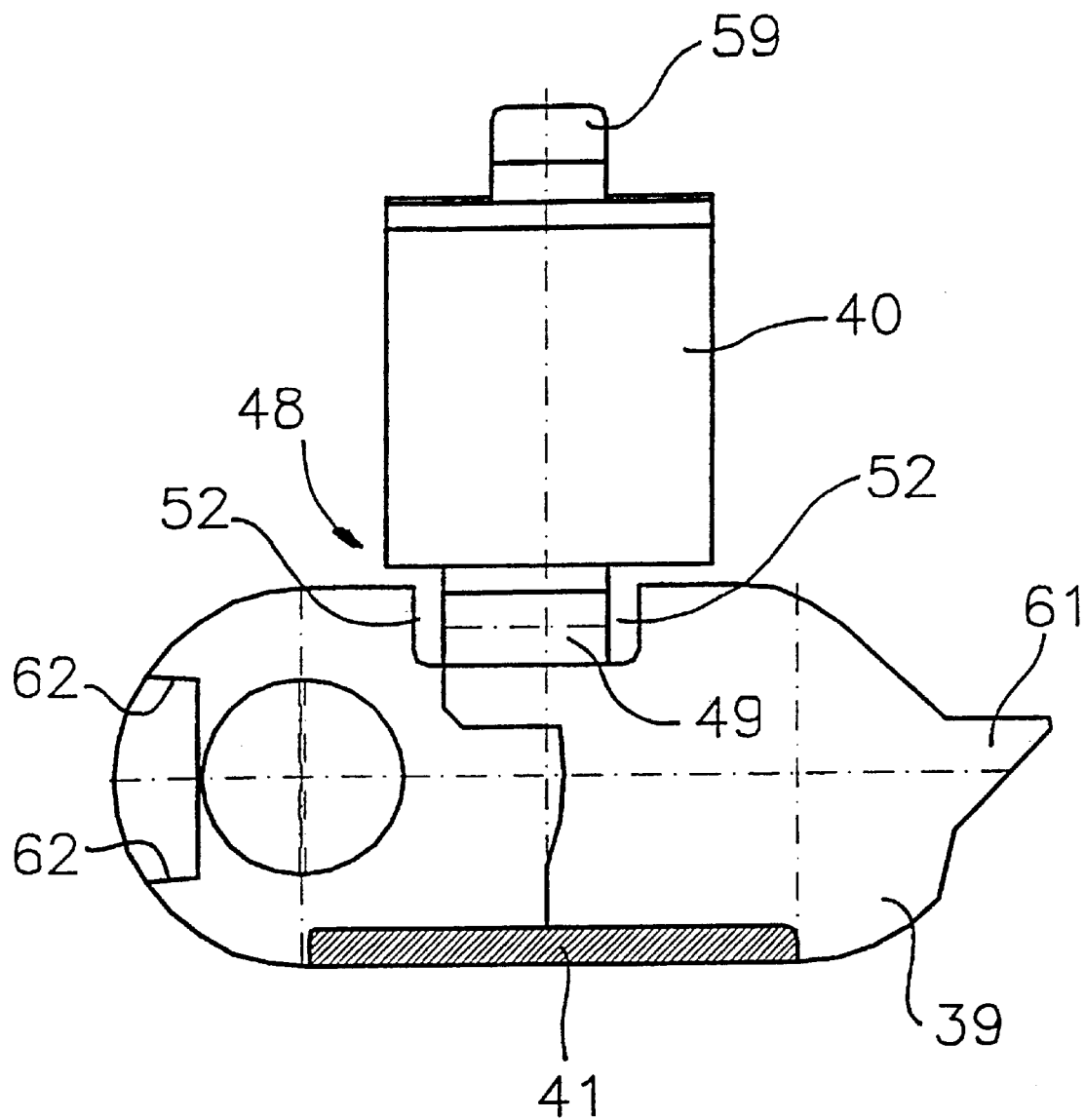
FIG. 17 is a longitudinal sectional view of the chain link of FIG. 13.
Figure 19:
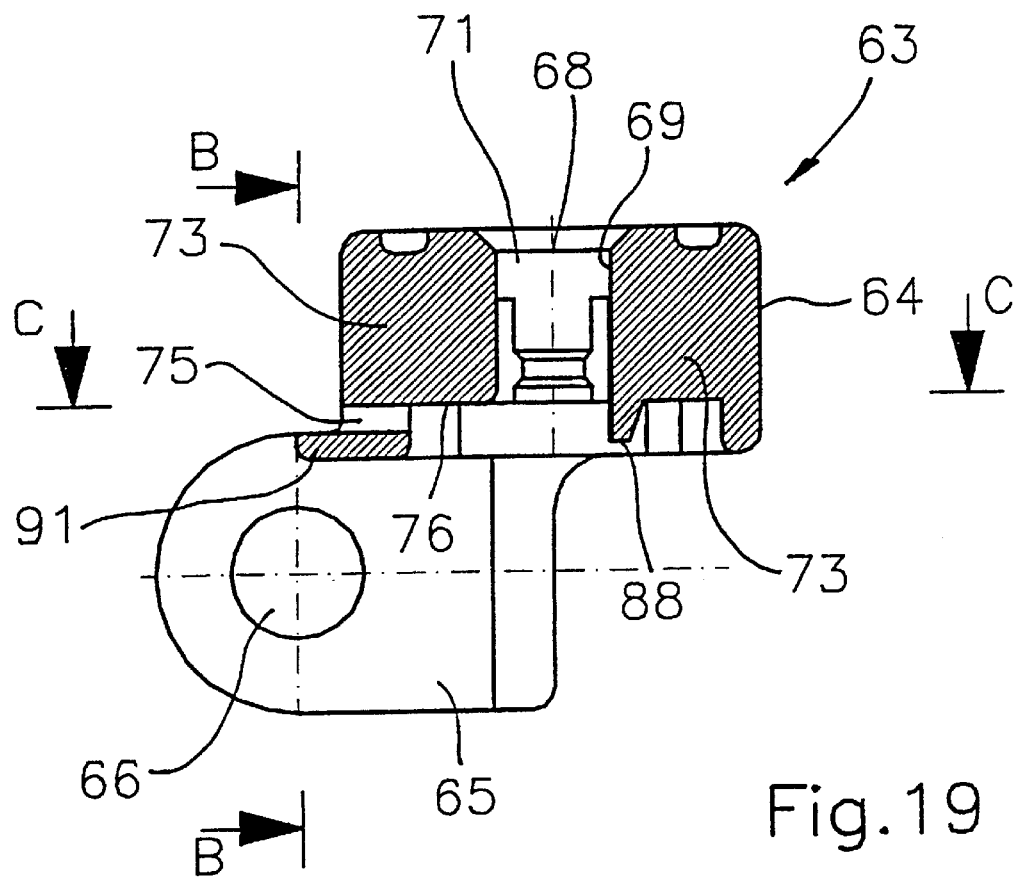
FIG. 19 is a sectional view of the connecting link along line A—A of FIG. 18.
Figure 18:
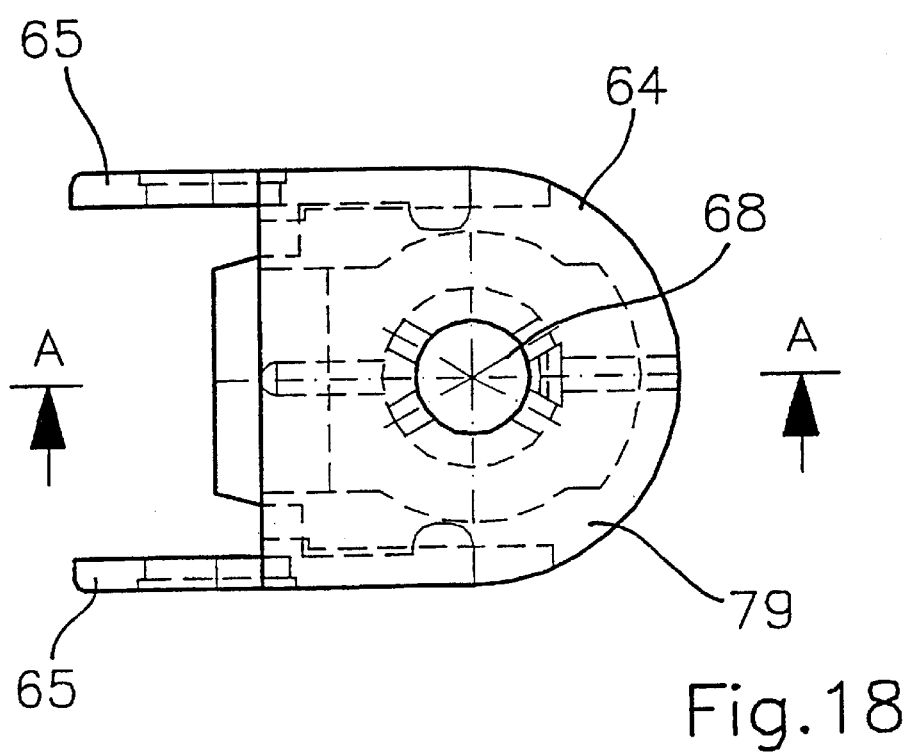
FIG. 18 is a front view of the basic form of a connecting link.
Figure 20:
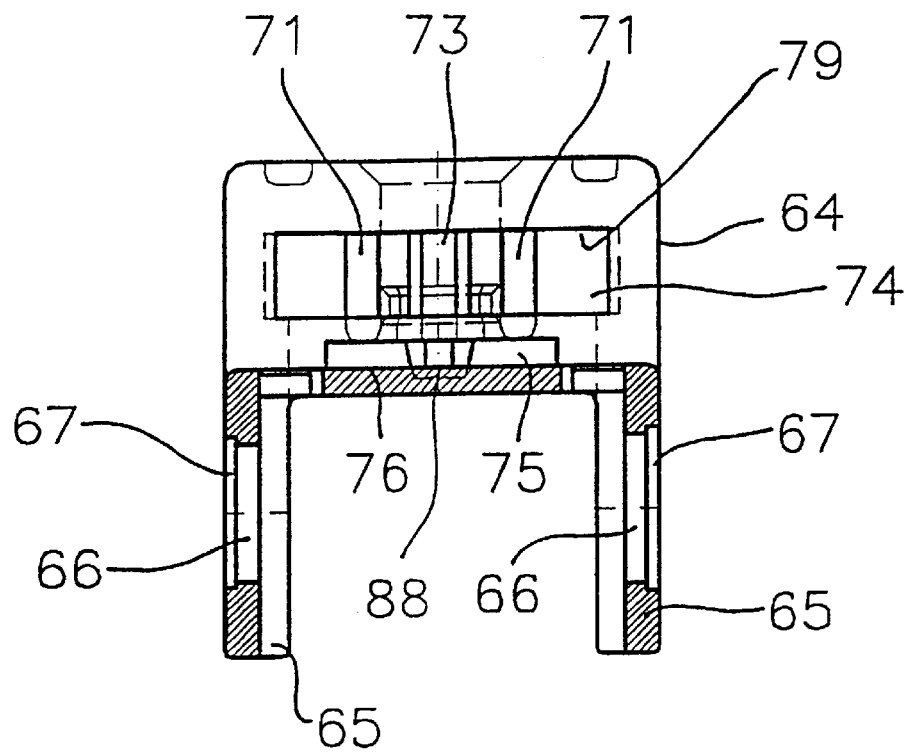
FIG. 20 is a sectional view of the connecting link along line B—B of FIG. 19.

The chain link 37 comprises two opposite link plates 38, 39 extending in spaced relationship in a longitudinal direction of the energy line guide chain. The link plates are interconnected by a crosspiece 41. Together with the crosspiece 41, they form a U-shaped basic form of the chain link 37. As best seen in FIG. 17, the crosspiece 41 extends to the overlapping regions of the link plates, so that it forms a cover.

Each link plate 38, 39 comprises a joint body 42 and a joint receiver 46.

Figure 14:
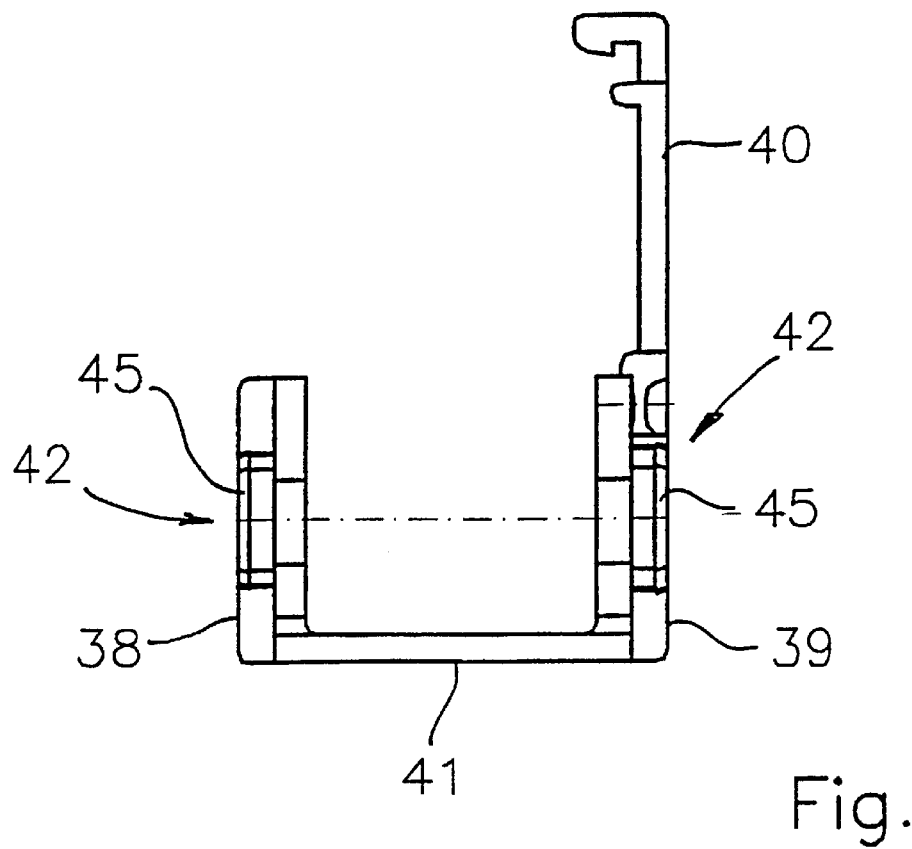
FIG. 14 is a side view from the right of the chain link of FIG. 13.

The joint body 42 is made integral with an outer side of link plates 38 and 39 respectively, as shown in FIG. 14. The joint body 42 is formed by joint body segments 43, which are separated by slots 44. On its free end portion, the joint body 42 comprises a radially outward directed collar 45. Likewise, the collar 45 is subdivided by slots 44. In the illustrated embodiment, three slots 44 are provided, each 120° out of phase.

The joint bodies 42 are provided in end regions of link plates 38, 39. The opposite end regions of link plates 38, 39 accommodate the joint receivers 46. The joint receivers 46 have a substantially elliptical cross section, so that the joint bodies are capable of pivoting in the corresponding joint receivers such as to deflect adjacent chain links 37 relative to each other in the lateral direction.

The joint receiver 46 comprises a circumferential cavity 47. This cavity is made substantially coaxial with the joint receiver 46. The depth of the joint receiver corresponds substantially to the thickness of collar 45.

A crosspiece 40 is flexibly hinged to the link plate 39, and can be detachably connected with its other end to the link plate 38. The connection of crosspiece 40 to link plate 39 is formed by a film hinge 48. The film hinge 48, link plate 39, and crosspiece 40 are made in one piece.

Figure 15:
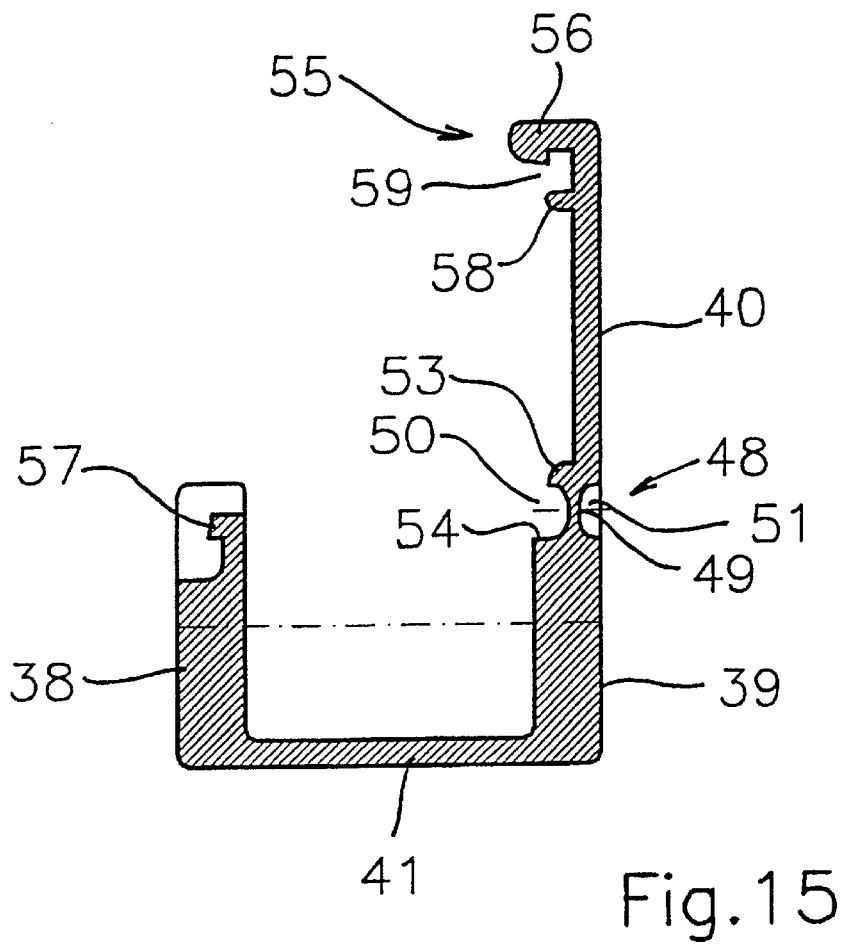
FIG. 15 is a cross sectional view of the chain link of FIG. 13.

The film hinge 48 is formed in an edge portion of link plate 39. On both sides of the film hinge 48, clearances 52 are provided, as shown in FIG. 17. The film hinge is formed by a film bridge 49, which connects with its one end to link plate 39, and with its other end to crosspiece 40. The thickness of film bridge 49 is smaller than the thickness of link plate 39. To form the film bridge 49, the edge region of link plate 39 contains recesses 50, 51 extending in the transverse and in the longitudinal direction of link plate 39, as shown in FIG. 15.

Figure 16:
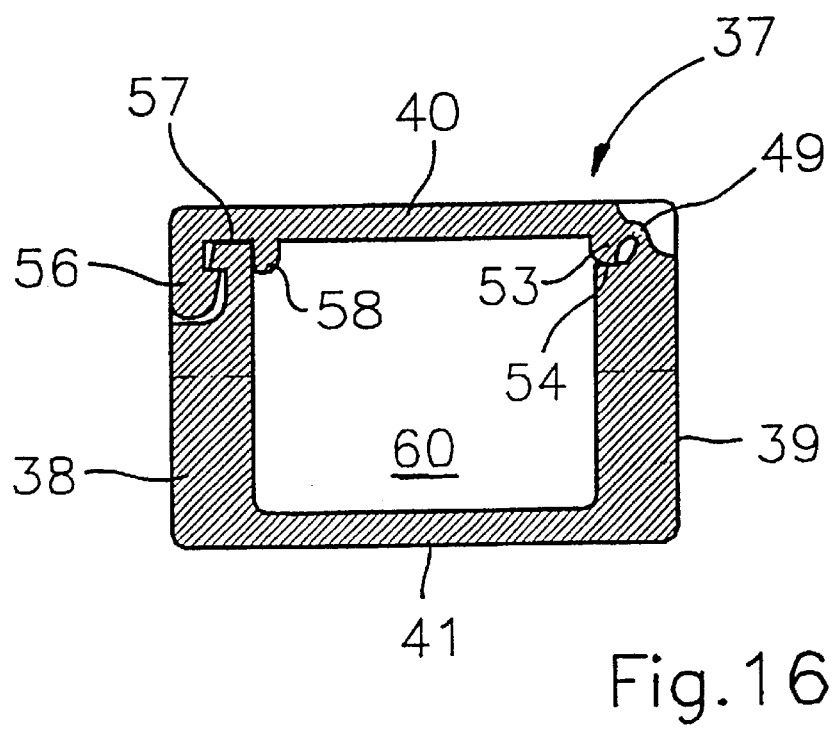
FIG. 16 is a cross sectional view of the chain link of FIG. 13 with a closed crosspiece.

In the region of film hinge 48, the crosspiece 40 comprises a projection 53 extending crosswise to the longitudinal direction of the crosspiece. In the closed state of chain link 37, the projection 53 lies on an edge 54 of recess 50, as shown in FIG. 16. This relieves the film hinge 48 and, thus, film bridge 49, when a force is exerted on the crosspiece 40 and in the direction of crosspiece 41.

The end region of crosspiece 40 opposite to film hinge 48 is provided with a locking element 55. The locking element 55 is formed by a hook 56. The hook 56 cooperates with a counterhook 57, which is formed in a recessed portion of the end region of link plate 38. In spaced relationship with hook 56, a ridge 58 is provided, which defines together with the hook 56 a space 59 for engaging counterhook 57. With its one surface, the ridge 58 lies against the inner surface of link plate 38, as shown in FIG. 16. The ridge 58 makes it possible to reduce at least, if not avoid altogether, a mobility and, thus, a stress on film hinge 48, since the crosspiece 40 is prevented from moving in its longitudinal direction.

The link plates 38, 39 and crosspieces 40, 41 define a channel section 60 for laying lines, in particular electrical lines.

To limit the angle of traverse of adjacent chain links about an axis extending crosswise to the longitudinal direction of the energy line guide chain, preferably each link plate comprises at its end a stop element 61. The opposite end of the link plate is provided with stop surfaces 62. The stop elements 61 cooperate with the stop surfaces 62 of an adjacent chain link. The stop surfaces 62 are formed in a plane extending substantially parallel to a center plane of the link plate. Preferably, the stop surfaces are made equidistant from the center plane. Likewise, the stop element 61 is formed in the region of the center plane of the link plate.

To secure an energy line guide chain to a stationary and/or mobile connection, the energy line guide chain comprises connecting links.

FIGS. 18–21 illustrate the configuration of a preferred embodiment of a connecting link 63. The connecting link 63 is formed by a base body 64. The base body 64 connects to two link plates 65. The link plates 65 are arranged in spaced and in facing relationship. Each link plate 65 comprises a joint receiver 66. On the external side faces of the link plates 65, the joint receiver 66 comprises cavities 67.

The configuration of the joint receivers 66 corresponds to that of the joint receivers of the above-described chain links, so that the connecting link 63 can be joined to corresponding joint bodies. This is not mandatory. Depending on which end of an energy line guide chain is intended to receive the connecting link, the connecting link may also be provided with corresponding joint bodies, which are adapted for engaging corresponding joint receivers.

The base body 64 is provided with a receptacle 68, which is adapted for accommodating a connection element not shown. The connection element is attached to a connection point. In the illustrated embodiment, the receptacle 68 is designed and constructed crosswise to the longitudinal axis of an energy line guide chain, which is not absolutely mandatory. The joint receiver may also be made parallel to the longitudinal axis of an energy line guide chain. It may even intersect the longitudinal axis of the energy line guide chain at an angle.

Figure 21:
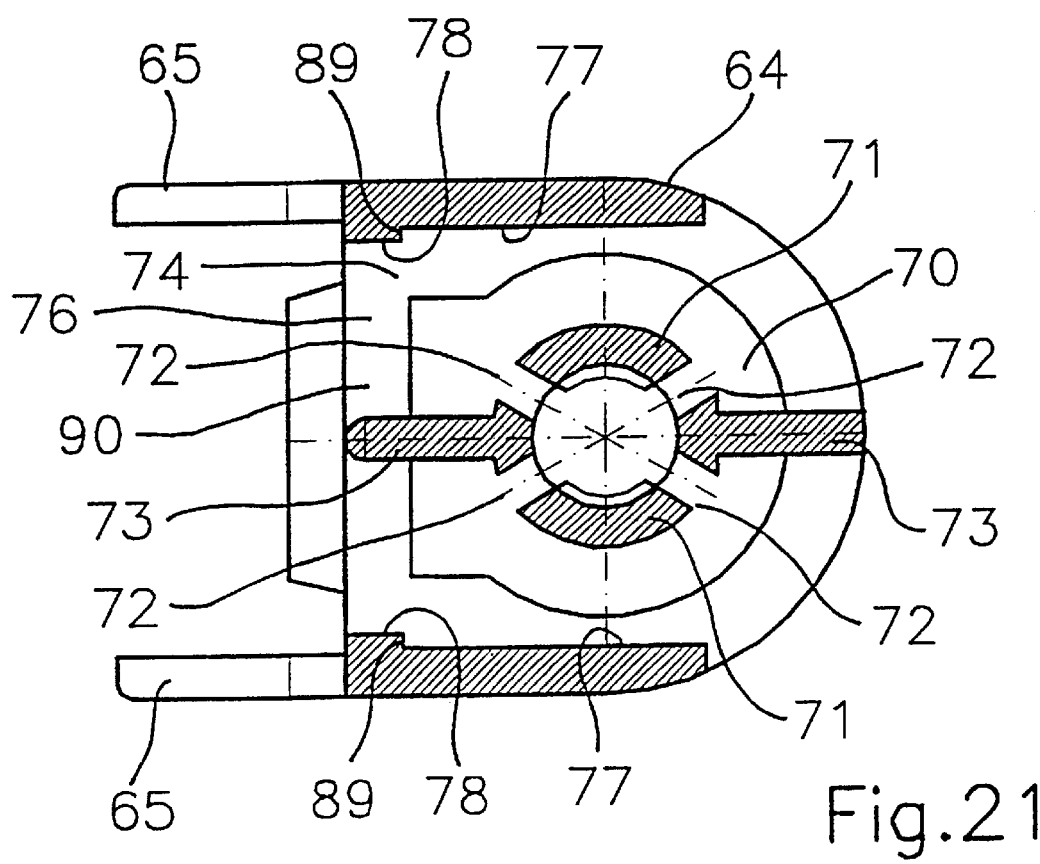
FIG. 21 is a sectional view of the connecting link of FIG. 18 along line C—C of FIG. 19.
Figure 24:
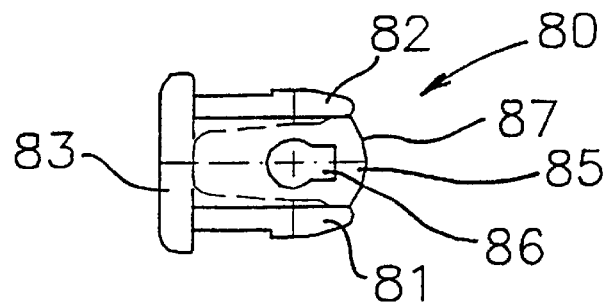
FIG. 24 is a bottom view of the locking element.
Figure 25:
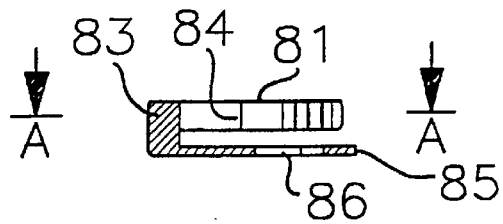
FIG. 25 is a sectional view of the locking element along line C—C of FIG. 22.
Figure 22:
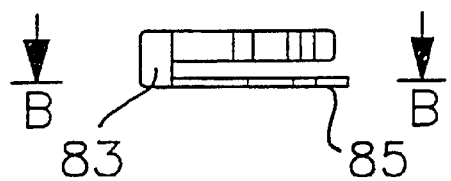
FIG. 22 is front view of a locking element for a connecting link of FIG. 18.
Figure 23:
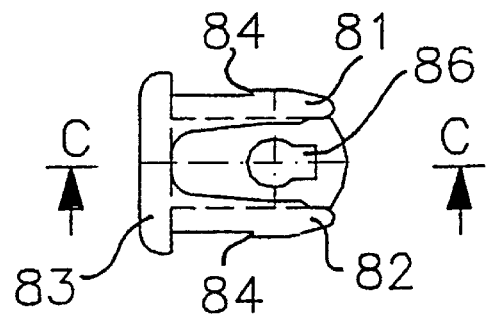
FIG. 23 is a top view of the locking element.
Figure 26:
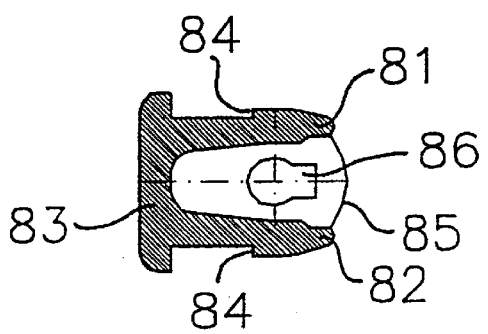
FIG. 26 is a sectional view of the locking element along line A—A of FIG. 24.
Figure 27:
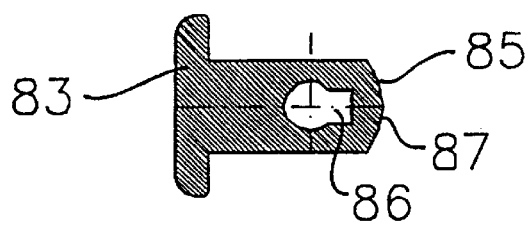
FIG. 27 is a sectional view of the locking element along line B—B.

The receptacle 68 is bounded by a wall 69. The wall 69 extends from a bottom wall 70 to a cover wall 79. The wall 69 is made integral with the bottom wall 70. The wall 69 is formed by wall segments 71, 73. In the illustrated embodiment, four wall segments are provided. The wall segments are separated from one another by slots 72, as shown in FIG. 21. The opposite wall segments 71 are made spring-elastic, so that same form a snap connection with the connection element not shown. The wall segments 73 are made substantially rigid.

Inside the base body 64, a slide-in opening 74 is provided. This slide-in opening extends substantially crosswise to the longitudinal direction of receptacle 68. The slide-in opening is defined by bottom wall 70, cover wall 79, and side walls 77. In the region of an inlet opening 90 in slide-in opening 74, the side walls 77 are provided with projections 78. The projections 78 are directed toward each other. The inside width of the inlet opening 90 is smaller than the inside spacing between the side walls 77, so that in the region of transition between the projection 78 and the side wall 77, a stop surface 89 is formed, as can be noted from FIG. 21.

The receptacle 68 extends through the bottom wall 70. Adjacent receptacle 68 is a projection 88. This projection 88 extends away from the bottom wall 70 of base body 64.

Below the bottom wall 70, a slide-in pocket 75 is provided. The slide-in pocket 75 is defined by bottom wall 70 and a transverse member 76. The transverse member 76 extends only over a portion of bottom wall 70, so that the receptacle 68 is unblocked.

FIGS. 22–27 illustrate a locking element 80. The locking element 80 cooperates with the base body 64 of connecting link 63, as will be described in greater detail further below.

The locking element 80 is substantially U-shaped. It comprises two legs 81, 82, which are interconnected by a common base 83. The free legs 81, 82 are made spring-elastic. On its outer surface, each leg 81, 82 comprises a stop 84, which is formed by a surface extending substantially parallel to the base 83. The spacing between internal side surfaces of the legs 81, 82 corresponds substantially to the outside width of wall 69.

A safety flap 85 is provided in spaced relationship with the free legs 81, 82 and substantially parallel to same. The flap 85 comprises an opening 86, which is provided in the region of a free end face 87.

The locking element 80 is designed and constructed such that the free legs 81, 82 can be inserted into the slide-in opening 74. The safety flap 85 is adapted for engaging the slide-in pocket 75 of base body 64.

FIGS. 28–31 illustrate the connecting link with the locking element 80 in an assembled state. The free legs 81, 82 are inserted into the slide-in opening. Same do not contact the outer surface of wall segments 71, so that the wall segments 71 are capable of deflecting radially outward. On their inner surfaces 92, the wall segments 71 may comprise cavities and/or projections, which cooperate with correspondingly shaped projections or cavities of a connection element not shown, which can be inserted into the receptacle 68.

Figure 28:
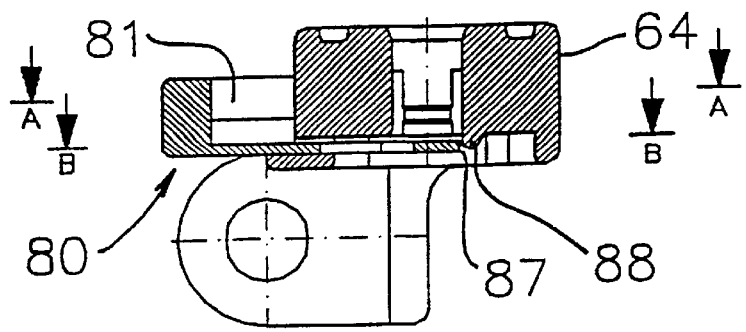
FIG. 28 is a sectional view of the connecting link of FIG. 18 with a locking element of FIG. 22 in an assembled position.
Figure 29:
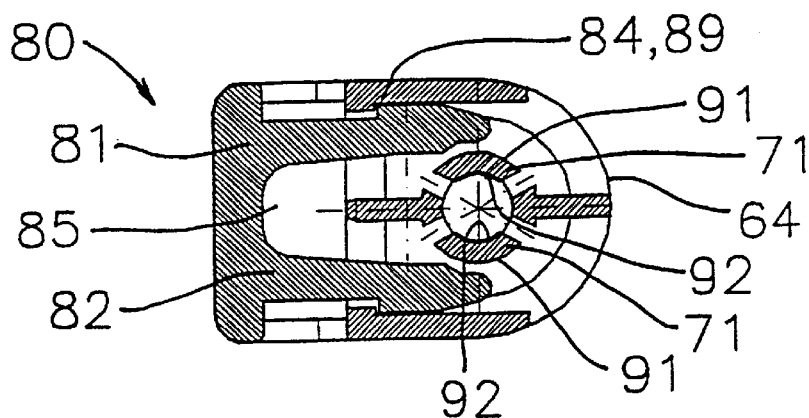
FIG. 29 is a sectional view of the connecting link with the locking element of FIG. 28 along line A—A of FIG. 28.
Figure 30:
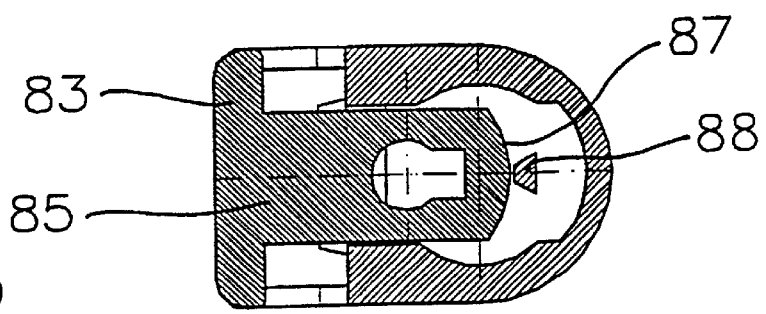
FIG. 30 is a sectional view of the connecting link with the locking element along line B—B of FIG. 28.

As can be noted from FIG. 28 and from FIG. 30, the end face 87 of safety flap 85 lies against projection 88. The projection 88 limits the path of displacement of locking element 80 crosswise to the receptacle 68.

The locking element 80 is undetachably connected to base body 64. To this end, stop surfaces 84, 89 are provided. The surfaces 84, 89 limit the mobility of locking element 80, so that the latter cannot be removed from slide-in opening 74 without compressing the free legs 81, 82.

Figure 31:
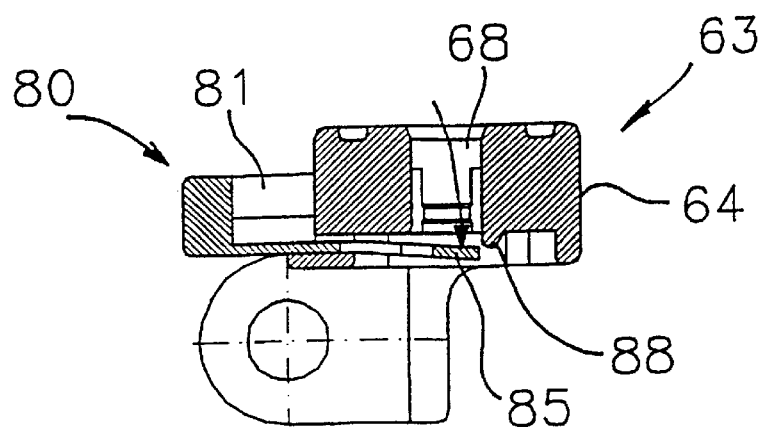
FIG. 31 is a sectional view of the connecting link with the locking element and with a deflected safety flap.
Figure 32:
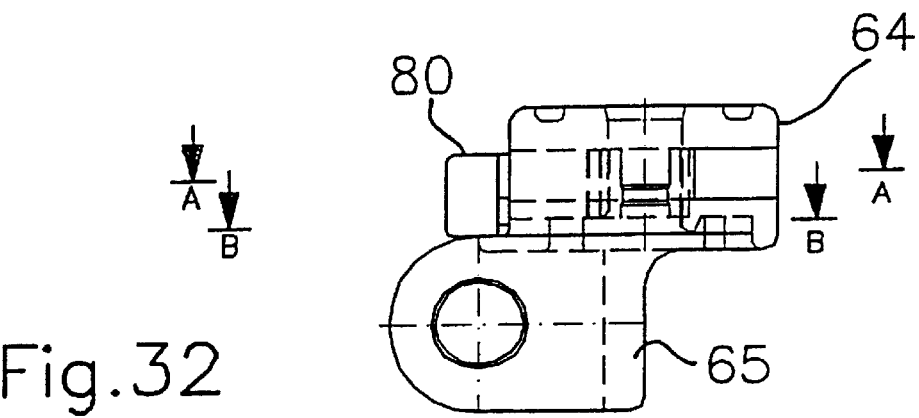
FIG. 32 shows the connecting link with the locking element in an end position of the locking element.

When the connecting link 63 is connected to a connection element not shown, the connection element will engage opening 68. To prevent the connecting link 63 from disengaging from the connection element, a snap-in engagement occurs between the walls 71 and the connection element. To block this snap-in engagement, the locking element 80 is further pushed into slide-in opening 74, until it occupies the end or locking position shown in FIGS. 32–34. To realize that the locking element 80 is further pushed in inside the slide-in opening 74, the locking element 80 pushes the safety flap away from the base body 64, as shown in FIG. 31. The safety flap 85 is pushed away from base body 64 so far that it is possible to slide the safety flap 85 over the projection 88.

Figure 33:
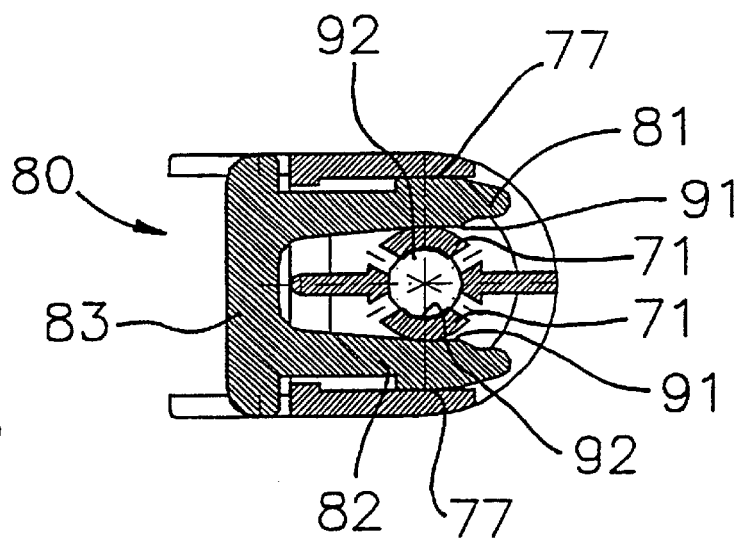
FIG. 33 is a sectional view of the connecting link with the locking element along line A—A of FIG. 32.

At the same time, this movement causes the free legs 81, 82 to slide between the side walls 77 and the outer surfaces 91 of wall segments 71, so that the free legs 81, 82 lie both against the side wall 77 and against the outer surface 91 of wall segments 71, for purposes of preventing the wall segments 71 from moving radially outward. FIG. 33 illustrates the position of legs 81, 82, in which the locking engagement is reached.

Figure 34:
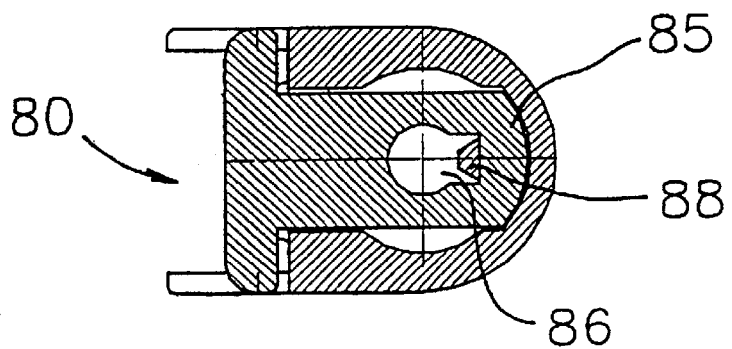
FIG. 34 is a sectional view of the connecting link with the locking element along line B—B of FIG. 32.

FIG. 34 illustrates the position of safety flap 85, which same will occupy, when the locking position is reached. In this position, the projection 88 engages opening 86. Likewise in this position, an end portion of the connection element may extend through the receptacle 68 right into the opening 86.

The projection 88, which extends at least in part into the opening 86, ensures that the locking engagement will not be released unintentionally. To disengage, it will be necessary to move the safety flap away from the base body 64, so that the projection 88 no longer engages opening 86, thereby allowing the locking element 80 to slide from its locking position to an assembled position.

Preferably, the receptacle 68 is made rotationally symmetric. A correspondingly configured, rotationally symmetric connection element engages same. As a result, a rotatability of the connecting link 63 about the longitudinal axis of the receptacle is achieved, thereby enabling an improved deflection capability of an energy line guide chain toward the side.

NOMENCLATURE

1 Chain link
2,3 Link plate
4,5 Crosspiece
6 Joint body
7 Joint receiver
8 Channel section
9 Convex portion
10 Corresponding portion
11 Axis
12 Energy line guide chain
13 Joint axis
14 Longitudinal axis
15 Pivot axis
16 Connection area
17 Gap
18 Outer surface area
19 Inner surface area
20 Clearance
21 Chain link
22,23 Link plate
24,25 Crosspiece
26 Joint body
27 Joint receiver
28 Channel section
29 Convex portion
30 Concave portion
31 Axis
32 Extension
33 Cutout
34 End face
35 Energy line guide chain
36 Joint axis
37 Chain link
38 Link plate
39 Link plate
40 Crosspiece
41 Crosspiece
42 Joint body
43 Joint body segments
44 Slot
45 Collar
46 Joint receiver
47 Cavity
48 Film hinge
49 Film bridge
50 Recess
51 Clearance
52 Gap
53 Projection
54 Edge
55 Locking element
56 Hook
57 Counterhook
58 Ridge
59 Space
60 Channel section
61 Stop element
62 Stop surface
63 Connecting link
64 Base body
65 Plate
66 Joint receiver
67 Cavity
68 Receptacle
69 Wall
70 Bottom wall
71 Wall segment
72 Slot
73 Wall segment
74 Slide-in opening
75 Slide-in pocket
76 Transverse member
77 Side wall
78 Projection
79 Cover wall
80 Locking element
81 Leg
82 Leg
83 Base
84 Stop
85 Safety flap
86 Opening
87 End face
88 Projection
89 Stop surface
90 Inlet opening
91 Outer surface
92 Inner surface

What is claimed is:

1. An energy line guide chain for running lines between a stationary and a moveable connection comprising
a plurality of interconnected plastic chain links, each chain link including two laterally spaced apart and parallel link plates extending in a longitudinal direction, and at least one crosspiece interconnecting the link plates, with the link plates of each chain link partially overlapping respective link plates of each longitudinally adjacent chain link, and with each link plate including a joint body and a joint receiver adjacent respective opposite ends of the link plate, with the joint body of each chain link engaged within a joint receiver of an overlapping link plate so as to define a joint axis which extends between the link plates and is perpendicular to the longitudinal direction, with a clearance formed between opposing faces of the overlapping link plates of adjacent chain links, and wherein each interengaging joint body and joint receiver defines adjacent surface areas which include two diametrically opposed gaps and two diametrically opposed contact areas where the adjacent surface areas are in contact and which define a pivot axis which is perpendicular to the longitudinal direction, and to the joint axis, so that the adjacent chain links can pivot relative to each other about, the joint axis and the pivot axis.

2. The energy line guide chain of claim 1 wherein the contact areas extend in directions which are substantially parallel to the longitudinal direction.

3. The energy line guide chain of claim 1 wherein the joint body is substantially circular in cross section, and the joint receiver is substantially oval in cross section.

4. The energy line guide chain of claim 1 wherein the joint body is substantially oval in cross section and the joint receiver is substantially circular in cross section.

5. The energy line guide chain of claim 1 wherein the pairs of adjacent chain links are configured for pivoting relative to each other about the joint axis over an angle of up to about 45°.

6. The energy line guide chain of claim 1 wherein each joint body comprises a plurality of annularly arranged body segments which are separated by slots.

7. The energy line guide chain of claim 1 wherein each joint body has a free end which includes a radially outwardly directed collar.

8. The energy line guide chain of claim 7 wherein each joint receiver includes a circumferential cavity which is sized to receive the collar of the associated joint body.

9. The energy line guide chain of claim 1 wherein the at least one crosspiece includes a convexly curved portion which extends in the longitudinal direction from one side of the crosspiece, and a concave portion on the opposite side of the crosspiece which is configured to closely receive the convexly curved portion of a crosspiece of an adjacent chain link when the adjacent chain links are aligned in the longitudinal direction.

10. The energy line guide chain of claim 9 wherein the convexly curved portion and the concave portion are each symmetrical with respect to a longitudinal axis which is midway between the link plates.

11. The energy line guide chain of claim 1 wherein said at least one crosspiece of each chain link has a longitudinal length configured to cause the crosspieces of adjacent chain links to abut to thereby limit the relative pivotal movement about said joint axis in one direction.

12. The energy line guide chain of claim 1 wherein each chain length further includes a second crosspiece extending between the link plates and spaced below said at least one crosspiece, with said second crosspiece having a longitudinal length less than that of said at least one crosspiece so that the second crosspieces of adjacent chain links are spaced apart when the adjacent chain links are longitudinally aligned and abut each other when the adjacent chain links are relatively rotated about the joint axis to a predetermined angle.

13. The energy line guide chain of claim 1 wherein the at least one crosspiece is integrally connected to one of the link plates via a film hinge and is configured for releasable attachment to the other link plate.

14. The energy line guide chain of claim 13 wherein the at least one crosspiece includes a projection adjacent the film hinge so that in a closed position of the crosspiece the projection engages an edge of the associated link plate.

15. The energy line guide chain of claim 1 wherein at least one link plate includes a stop element projecting longitudinally from one end and a'stop surface at its other end which is positioned so as to be engaged by the stop element of an adjacent chain link to thereby limit the relative rotation of the adjacent chain links about the joint axis.

16. The energy line guide chain of claim 1 wherein each of the chain links comprises a plastic material which is molded in one piece.

17. The energy line guide chain of claim 1 further comprising a terminal connecting link which comprises two laterally spaced apart and parallel link plates extending in a longitudinal direction, and a base body interconnecting the two link plates, with the base body including at least one receptacle which extends in a direction generally perpendicular to the longitudinal direction so as to be adapted to receive a connection element which is mounted to a connection point, and with the base body further including a slide-in opening which communicates with the receptacle, and a locking element slideably received in the slide-in opening for securing the connection element in the receptacle of the base body.

18. The energy line guide chain of claim 17 wherein the parallel link plates of the terminal connecting link are connected to respective link plates of an adjacent chain link so as to permit relative pivotal movement about a joint axis which is perpendicular to the longitudinal direction defined by the terminal connecting link.

19. The energy line guide chain of claim 18 wherein the receptacle is defined by an internal wall which is at least in part spring elastic so as to be adapted to form a snap connection with the connection element.

20. The energy line guide chain of claim 19 wherein the internal wall is defined by at least two wall segments which are separated by a slot.

21. The energy line guide chain of claim 19 wherein the internal wall is defined by four wall segments, with first opposite wall segments being substantially rigid and second opposite wall segments being substantially spring elastic.

22. The energy line guide chain of claim 21 wherein the locking element is slideable between (1) a locking position where the locking element impedes the deflection capability of the second opposite wall segments and (2) to a non-locking position where the deflection capability is not impeded.

23. The energy line guide chain of claim 22 wherein the locking element is U-shaped so as to define two free legs, with the free legs and slide-in opening being configured so that the free legs engage the second opposite wall segments in the locking position of the locking element.

24. The energy line guide chain of claim 23 wherein the locking element comprises a safety flap which is parallel to and spaced from the two free legs, wherein the base body includes a projection which extends into the plane of movement of the safety flap, with the safety flat and projection being configured to engage each other and prevent movement of the locking element to the locking position unless the safety flat is deflected.

25. The energy line guide chain of claim 24 wherein the safety flap has an opening which engages the projection in the locking position to prevent unintentional movement of the locking element from the locking position unless the safety flap is deflected.

* * * * *